United States Patent [19]

Herbert et al.

[11] 4,385,268

[45] May 24, 1983

[54] TWO-QUADRANT OPERATION SYSTEM FOR A SLIP-RECOVERY DRIVE

[75] Inventors: Roger B. Herbert, Williamsville, N.Y.; Louis W. Herchenroeder, Homosassa, Fla.

[73] Assignee: Westinghouse Electric Corp., Pittsburgh, Pa.

[21] Appl. No.: 229,413

[22] Filed: Jan. 29, 1981

[51] Int. Cl.³ .................................................. H02P 5/40
[52] U.S. Cl. .................................. 318/732; 318/762; 318/809
[58] Field of Search ............... 318/762, 803, 809, 799, 318/732; 363/37

[56] References Cited

U.S. PATENT DOCUMENTS

| | | | |
|---|---|---|---|
| 3,675,099 | 7/1972 | Johnston | 318/762 |
| 4,091,294 | 5/1978 | Zankl et al. | 318/808 |
| 4,186,435 | 1/1980 | Cailloux | 318/722 |

OTHER PUBLICATIONS

Maag, R. B., "Characteristics and Application of Current Source/Slip Regulated AC Induction Motor Drives" IEEE-IAG-Annual Meeting, Cleveland, Ohio Oct. 18-21.

Phillips, K. P. "Current-Source Converter For AC Motor Drives" IEEE Transactions on Industry Aplications, vol. IA-8, No. 6, Nov./Dec. 1972, pp. 679-683.

Murphy, J. M. D., *Thyristor Control of AC Motors*, Pergamon Press, 1973, pp. 161-169.

Le-Huy et al., "Microprocessor Control of a Current FED Synchronous Motor Drive" Conference: Industry Applications Society IEEE-IAS Annual Meeting, Cleveland, OH, USA, Sep. 30-Oct. 4, 1979.

*Primary Examiner*—David Smith, Jr.
*Attorney, Agent, or Firm*—C. M. Lorin

[57] ABSTRACT

SCR devices replace the usual diodes of the rectifier bridge section of a wound-rotor slip-recovery system motor drive, and by selection of the retardation angle of the SCR's between either zero or close to 180°, two-quadrant operation is made possible, which includes reverse torque and reverse rotation, while controlling the retardation angle of the power line bridge of SCR's.

4 Claims, 27 Drawing Figures

90° FIRING ANGLE

FIG. 2D

120° FIRING ANGLE

FIG. 2E

150° FIRING ANGLE

(SLIP-RECOVERY THROUGH INVERTER BRIDGE)

FIG. 5A

SUPER SYNCHRONOUS SPEED 140%

FIG. 5B

SUPER SYNCHONOUS SPEED 200%

FIG. 5C

REVERSE TORQUE

TWO-QUADRANT OPERATION SYSTEM FOR A SLIP-RECOVERY DRIVE

REFERENCE TO A COPENDING APPLICATION

The present application is related to patent application Ser. No. (W.E. 49,107) filed concurrently by R. B. Herbert, A. F. Wilkinson and L. W. Herchenroeder for "Controlled Rotor Rectifier Arrangement For a Slip-Recovery Drive".

BACKGROUND OF THE INVENTION

The invention relates to a wound-rotor slip-recovery motor drive system. The wound-rotor slip-recovery drive has been recognized as very efficient, rugged and low cost to operate.

Static slip-recovery drives are known and have been found to be advantageous for many specific applications. Slip-recovery is a technique generally used with an induction motor of the wound-rotor type. When a variable voltage, variable frequency AC power supply is not available for the stator, or such complexity is not desired, a variable speed drive can be achieved by controlling the rotor current. This approach which involves a controlled return to the network of the energy not used by the load, has been known with an additional machine as the Scherbius system, or as the Kramer system. With the advent of SCR power switches, control of the rotor current and slip-recovery have been practiced statically. See for instance "Principles of Inverter Circuits" by B. D. Bedford and R. G. Hoft, page 404, Figure 1154, John Wiley 1964. See also: Proc. IEE, Vol. 110, No. 8, August 1963, "Switching Drive of Induction Motors" by M. S. Erlicki and Y. Wallach, pp. 1441–1450; IEEE transactions PAS-85, No. 1, January 1966, "Inverter Motor Speed Control With Static Inverters in the Rotor", pp. 76–84; and IEEE transactions IGA-5, No. 1, Jan./Feb., 1969, "Slip Power Recovery in an Induction Motor by the Use of a Thyristor Inverter" by William Shepherd and Jack Stanway, pp. 74–82.

The prior art method consists in rectifying the AC current induced as secondary in the rotor of the motor and in creating in the DC link a counter-electromagnetic-force voltage opposed to the rectified DC voltage, through coupling of an inverter between the AC power supply and the DC link. Generally, a transformer is used to couple the AC side of the inverter to the network. Thus, SCR control provides speed and torque control of a wound-rotor motor having a stator powered from a constant voltage-fixed frequency source.

The motor is controlled by controlling the gating angle of the thyristors of the inverter, therefore, the back EMF introduced in the DC link by the inverter, and ultimately the current in the rotor. In other words, the inverter controls the DC link voltage, whereby the DC link current is controlled, thus, the AC current in the wound-rotor. Accordingly, the torque is being controlled. The regulator of such a slip-recovery system includes two nested loops: a current inner loop and a speed outer loop.

Such motor drives are particularly useful for pump and fan drives, since these generally operate close to top speed. However, motor operation is not continuous and there is a speed cycling from zero speed to full speed and back. Such abrupt changes in and out of normal operation are extremely unfavorable in several respects.

It is known how to control the operation of a wound-rotor slip-recovery motor drive to achieve speed and torque control by controlling in a delayed ignition angle mode the thyristors of the inverter coupled between the DC link and the main power supply. See for instance:

Shepherd, W. and Stanway, J., "The Polyphase Induction Motor Controlled by Firing Angle Adjustment of Silicon Controlled Rectifiers", IEEE Intereat Convention Record 1964, (4) pp. 135–154.

This type of drive, however, raises problems which are to be solved in order to take full advantage of these inherent qualities. For instance, outside the normal operative range, measures have to be taken for speed adjustment, either in order to smoothly and rapidly increase or reduce the speed or for an abrupt stop in case of an emergency. Moreover, there is a need to prevent an excessive motor rating normally called for operation outside the operative range.

In contrast to the aforementioned control approach, it is now proposed to substitute SCR devices for the diodes which constitute the rectifier side in the rotor of the wound-rotor motor, and to so control the SCR devices at the rectifier side concurrently with the SCR devices at the power line side so as to achieve similar and better results.

The idea of replacing the diodes of the rectifier bridge of the rotor of a slip-recovery system by SCR devices is found in "Control In Power Electronics and Electrical Drives" Proceedings of the Second IFAC Symposium, Dusseldorf, West Germany, Oct. 3–5, 1977 (Program Press 1978) pp. 559–566 in a paper entitled "Supersynchronous Static Converter Cascade" by P. Zimmermann. The object, in this prior art, is to extend the operative range of a wound-rotor slip recovery drive above synchronous speed, in fact doubling for the same rating, the speed range so that the SCR's are working as diodes in the rotor bridge within the subsynchronous range and as inverter devices of the same bridge when in the supersynchronous range. Moreover, in the aforementioned paper of Zimmermann, the rotor bridge while in the inverter mode is controlled by forced commutation.

An object of the present invention is to maximize the efficiency of a wound-rotor slip-recovery drive for speeds below the normal speed operative range.

A further object of the present invention is to provide two-quadrant operation of a wound-rotor slip-recovery drive, thereby to enable controlled acceleration or deceleration of a wound-rotor slip-recovery motor drive.

These and other objects will appear from the description hereinafter of the invention in its preferred embodiments.

SUMMARY OF THE INVENTION

The aforementioned objects are achieved, in accordance with the invention by providing a static bridge of SCR devices between the AC output of the rotor of the induction motor and the DC link to the static converter bridge feeding back energy from the rotor to the power supply, and by controlling the firing angle of the SCR's of the line bridge as a function of the operative parameters of the AC motor output while establishing selected predetermined retardation angle settings for the SCR's of the rotor bridge, thereby to control the speed of the motor selectively through a two-quadrant region.

PRELIMINARY CONSIDERATIONS REGARDING THE GATING OF THYRISTORS IN THE CONTEXT OF THE INVENTION

The present invention rests up on the idea that at the entry of the DC link to the line bridge returning slip energy to the network, control of rectifiers out of the rectifying mode into an inverting mode can provide definite advantages in the subsynchronous speed range without affecting the operation at full speed in a fan or pump type of AC motor drive. This is an approach which is different from the one found in PESC-77 Record pages 262-267 in an article by S. B. Dewan and J. R. Sylvester entitled "Thyristor Controlled Rectifying Inverting At Unity Power Factor" where a chopper is used to vary the DC link voltage and current. Operating on the rectifier itself to modify the DC link is indeed anomalous once it is realized that the AC output of the rotor is a three-phase power supply of widely varying voltage and frequency as the motor passes from zero speed to full speed and conversely. Introducing SCR devices in the rotor rather than diodes, will allow the bridge to operate in an inverting mode with particular firing angles, as generally known, for instance, from the aforementioned page 404 and FIG. 11.54 of "Principles of Inverter Circuits" by B. D. Bedford and R. G. Hoft. However, the extreme variability of the voltage and frequency input of such inverter makes it unusual and difficult in the present situation to control the SCR devices in a natural mode of commutation.

Accordingly, it is now proposed with a wound-rotor slip-recovery drive system having SCR devices connected in a bridge at the AC output of the rotor, to improve the gating of the SCR devices so as to enable operation of the motor bridge in either a rectifying or an inverting mode relative to the DC link and while controlling the line bridge to run the motor through a range extending between zero speed to full speed.

It is also proposed, according to the present invention, to provide natural commutation of the SCR devices of two bridges connected at opposite ends of the DC link of a wound rotor slip-recovery system for all speeds in a range between zero and full speed.

More specifically, the invention allows either electrodynamic acceleration, deceleration or reverse rotation of a wound-rotor motor by establishing selected gating angles for the thyristors substituted for the diodes of the bridge normally connected directly on the rotor of a slip-recovery system.

When the rotor thyristors are gated at zero degrees, they operate in fact as diodes. However, to start the motor, the thyristors are initially and typically fired at 60°. As a result, the motor voltage is reduced by half, thus allowing a lower overall rating for the line bridge and transformer equipment which sees the DC link voltage. The thyristors are thereafter, during acceleration of the motor, fired at an angle of retardation progressively reduced to zero at which time the normal speed range will have been reached and the thyristors from then on will operate as diodes. Similarly control of the rotor bridge at typically 155° retardation will allow complete deceleration to zero speed. Moreover when the rotor thyristors are gated with much retardation, such as at 155°, the rotor current is caused to be shifted with respect to the stator flux, so that the rotor torque becomes negative. The motor drive will now rotate in the reverse direction typically at 87% of the rated torque.

Thus, without any basic change to a wound-rotor slip-recovery drive system, by merely changing the diodes of the rectifier to be thyristors and by properly gating such thyristors, a slip-recovery motor drive has become capable of operation in a reversible mode together with controlled acceleration or deceleration between zero and full speed. Under such conditions of operation natural commutation of the thyristors requires a wide frequency range type of gating system.

Accordingly, the present invention also provides an improved thyristor gating system which is particularly suited for speed control of a wound-rotor slip-recovery system through a wide speed range, including zero speed and maximum speed, either with forward or with reverse torque.

Figure 1:
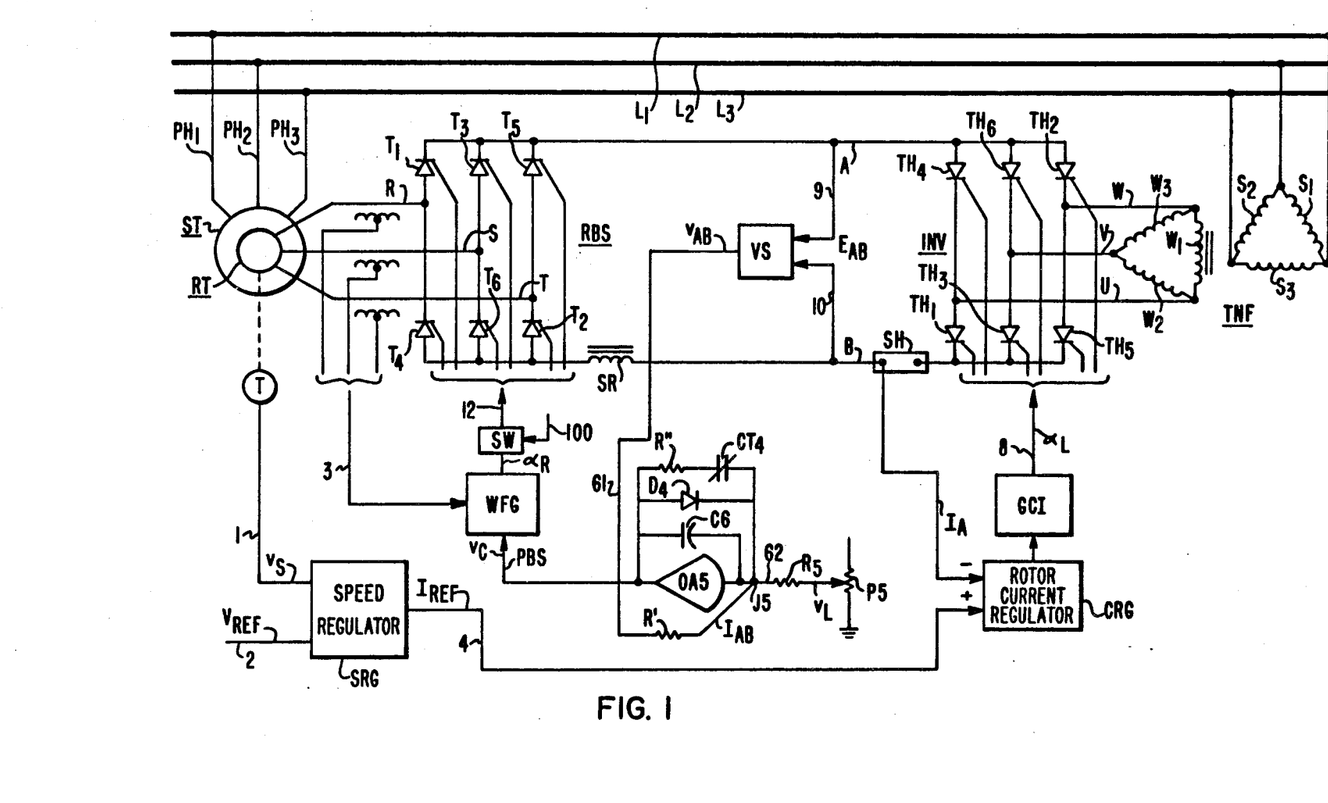
FIG. 1 is a block diagram representing the slip-recovery motor drive system according to the invention.

Referring to FIG. 1 the wound-rotor AC motor drive system according to the invention includes a rotor bridge section RBS comprising SCR derives $T_1-T_6$ connected to phases R, S, T at the output of the rotor RT of an induction motor having its stator ST supplied with AC current from the three-phase industrial network $L_1, L_2, L_3$. In the normal mode, at the output, the rotor bridge section RBS generates DC current which passes through a DC link DCL which includes a smoothing reactor SR and a shunt SH. The DC link has a positive polarity terminal A and a negative polarity terminal B. $E_{AB}$ is the voltage in the DC link. Between terminals A and B is mounted a bridge INV comprised of three thyristors $TH_1$-$TH_6$. The AC output of the line bridge INV comprising phases U, V, W is fed into the primary windings $W_1$-$W_3$ of a transformer TNF having secondary windings $S_1$-$S_3$ connected to the main AC power supply $L_1$, $L_2$, $L_3$. From shunt SH of the DC link, a signal $I_A$ representative of the rotor current is fed into a rotor current regulator CRG set at a current reference value $I_{REF}$ derived via line 4 from a speed regulator SRG which is itself controlled by the error between the rotor speed $V_s$ from a tachometer T and a speed reference signal $V_{REF}$.

It is assumed first that thyristors $T_1$-$T_6$ of the rotor bridge section RBS are fired at zero degree retardation, thus, that they operate simply as would diodes. In accordance with the known slip-recovery power such static drive is similar to a DC motor drive. Control of the speed of the wound-rotor motor is achieved by controlling the firing angle of the thyristors $TH_1$-$TH_6$ of the line bridge INV. The basic regulator composed of speed regulator SRG and current regulator CRG establishes the gating angle applied by gate controller GCI. The back EMF in the DC link AB due to the bridge in the inverter mode controls the rotor current and therefore the motor torque, thus motor speed.

Figure 2A:
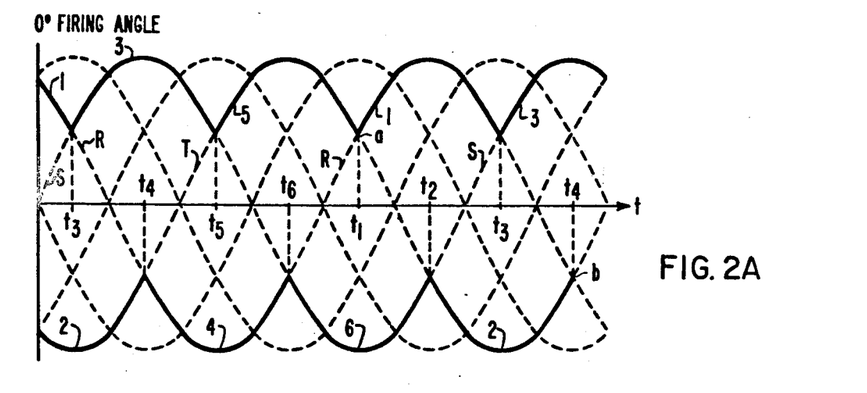
FIGS. 2A-2F represent the voltage of the line bridge of the slip-recovery system of FIG. 1 in the rectifying and inverting domains at various firing angles.
Figure 2B:
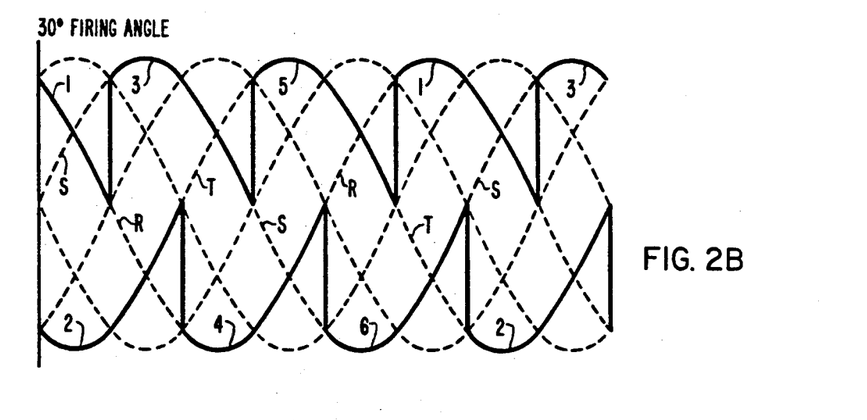
Figure 2C:
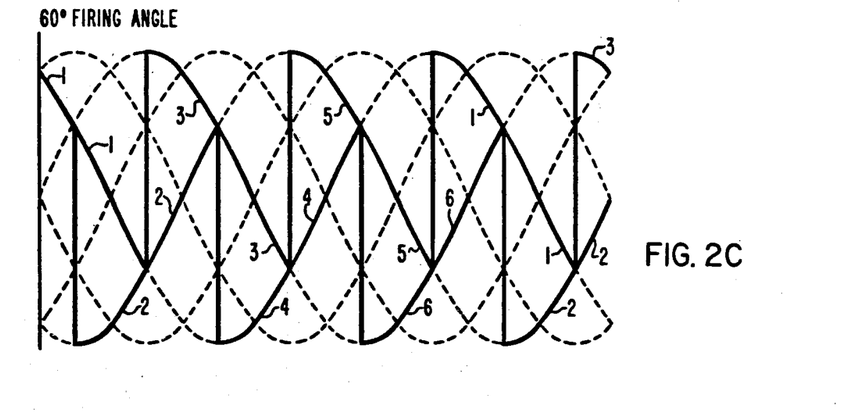
Figure 2D:
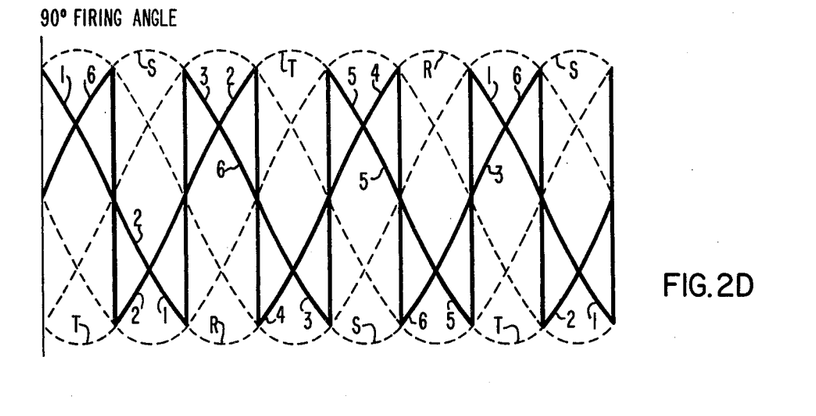
Figure 2E:
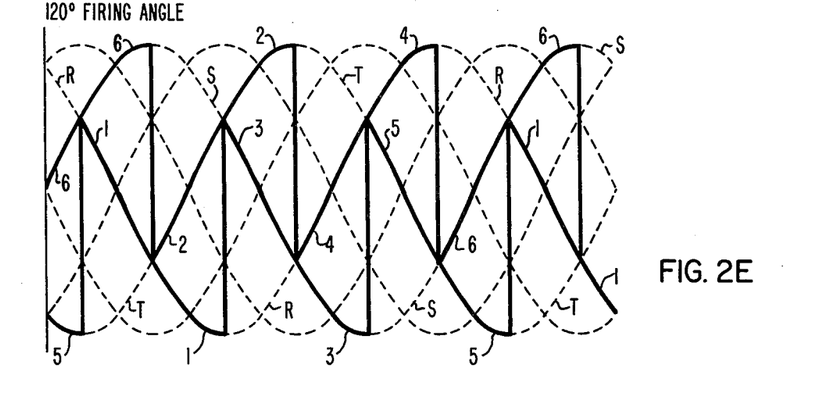
Figure 2F:
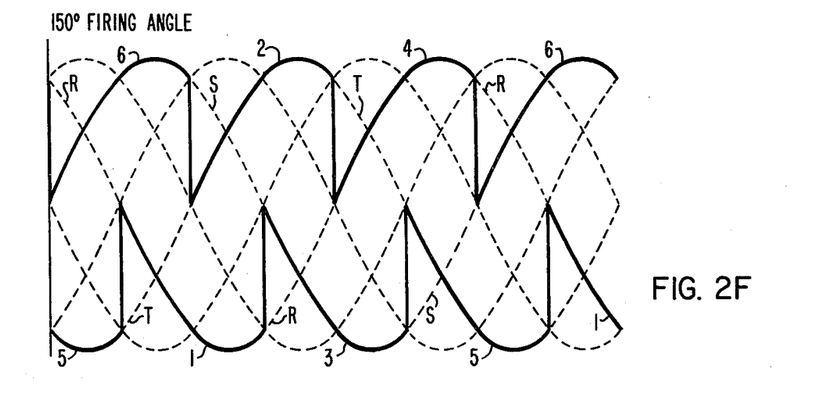

The line bridge INV derives rotor power outputted on phases U, V, W after rectification of the three phases R, S, T by the rotor bridge section RBS, and conversion into AC power by the inverter bridge INV. The power outputted on phases U, V, W is pumped back into the AC lines $L_1$, $L_2$, $L_3$ via transformer TNF. By closing each switch $TH_1$-$TH_6$ at the right point in time, the average DC voltage of the DC link between terminals AB can be controlled. When gating is such that under natural commutation the switch is turned ON at zero degree, as shown by FIG. 2A, the outputted DC voltage $E_{AB}$ is maximum. As the gating angle is retarded the output voltage decreases. This appears from FIGS. 2B, 2C. At 90°, (FIG. 2D) the average output voltage $E_{AB}$ is zero. As the firing angle determined by gate controller GCI exceeds 90°, being more and more retarded, the output voltage goes negative and increases in absolute value until a maximum negative voltage $-E_{AB}$ is reached for 180° delay. At negative output voltage, current will flow only if the DC voltage source as seen from the rotor bridge section RBS is greater than the line bridge output. In such case, power will flow from motor rotor side through line bridge INV, in the inverter mode, which converts the DC current into AC current, and by transformer TNF the energy is fed back to the AC lines $L_1$, $L_2$, $L_3$. This is the well-known slip-recovery technique of a wound-rotor induction motor. It also appears that the line bridge INV may be either converting, or inverting, depending upon the direction of power.

If the rotor bridge section RBS is now considered in its full generality due to the presence, according to the present invention, of thyristors $T_1$-$T_6$, rather than diodes as in the prior art, it is observed here that the rotor bridge section, depending upon firing angle control of the thyristors, $T_1$-$T_6$, can also be either converting or inverting under natural commutation by the three input lines R, S, T from the rotor RT.

Referring to FIG. 1, the six thyristors $T_1$-$T_6$ of the rotor bridge section RBS are gated from six parallel and respective lines 12 which are the output lines of a wide frequency gating circuit WFG.

Figure 3:
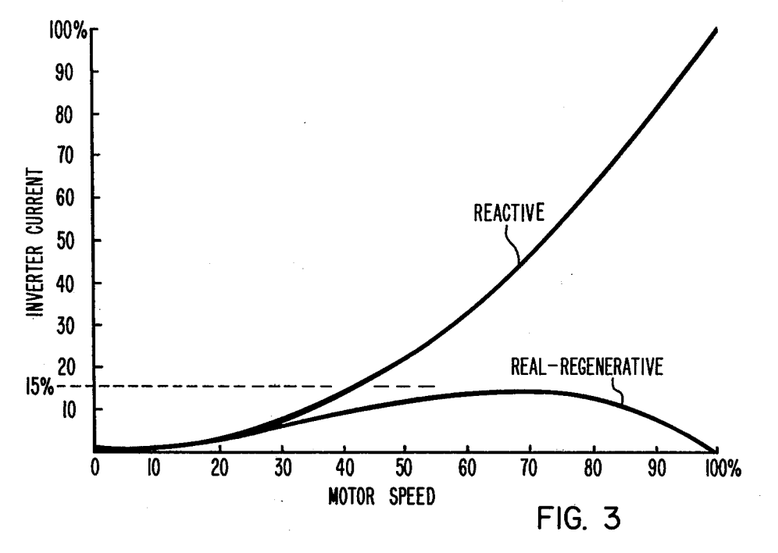
FIG. 3 shows a current/speed characteristic which is typical of an induction motor drive coupled to a load of the fan or pump type.
Figure 4:
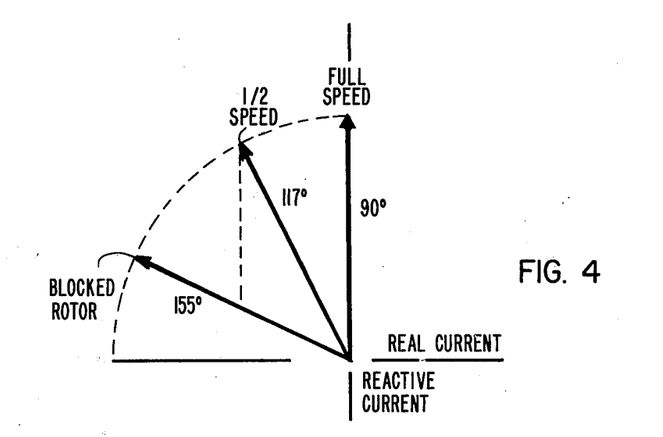
FIG. 4 shows the real and reactive portions of the inverter bridge of FIG. 1 when the rotor bridge at the opposite side of the DC link is gated at zero-degree retardation so that its thyristors behave like mere diodes.

The functional relation between rotor bridge RBS and line bridge INV will now be considered when as shown in FIG. 1, both bridges have SCR devices gated to be turned ON under natural commutation one by gate pulse generator WFG controlling the retardation angle $\alpha_R$ of thyristor $T_1$-$T_6$, the other by gate pulse generator GCI controlling the retardation angle $\alpha_L$ of thyristors $TH_1$-$TH_6$. It is assumed, for the purpose of illustration, that the induction motor is coupled to a load of the fan or pump type, that is, one having a current/speed characteristic such as shown in FIG. 3. Between 0 and 100% (or synchronous) speed the torque increases from zero as the square of the speed. In the same instance, FIG. 4 shows the real and reactive portion of the line bridge current when rotor bridge RBS is gated at zero degree (no retardation), e.g., when as stated earlier the thyristors $T_1$-$T_6$ behave like diodes.

As generally known, continuous speed control can be obtained by the insertion through the line bridge INV of a counter EMF in the DC link of the rotor circuit, which slip power is recovered through the feedback loop via transformer TNF. Thus, the inverter back EMF is an AC voltage source opposing the flow of current. The torque developed is proportional to the real (in-phase) component of the rotor current. Since the current depends upon the difference between the rotor voltage at the particular slip and the inverter voltage, the torque/current relationship is constant for a fixed firing angle of the rotor bridge.

A motor drive system can operate from zero speed to synchronous speed, or even at speeds above synchronous speed. The motor is the prime mover below synchronous speed, while power is absorbed from the shaft above synchronous speed. When the rotor acts as a brake, power is fed back to the power supply through the inverter INV, which comes from the stator and from the shaft.

Figure 5A:
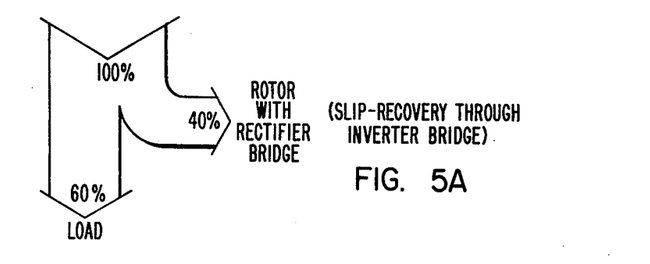
FIGS. 5A, 5B, 5C and 5D illustrate the direction and distribution of power between stator, rotor and load in situations of synchronous speed; supersynchronous speed, subsynchronous speed and reverse torque.

FIG. 5A shows the situation at 60% speed, where 40% of the power passes through rotor bridge RBS as slip-recovered energy to the line bridge INV, 60% power is delivered to the load through the shaft.

Figure 5B:
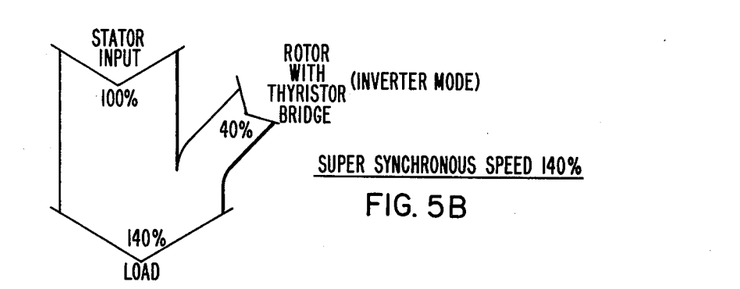

FIG. 5B shows the situation for supersynchronous speed, with 100% power from the stator, 40% power from rotor (where RBS operates in the inverter mode thanks to thyristors $T_1$-$T_6$), and the shaft delivers 140% power.

Figure 5C:
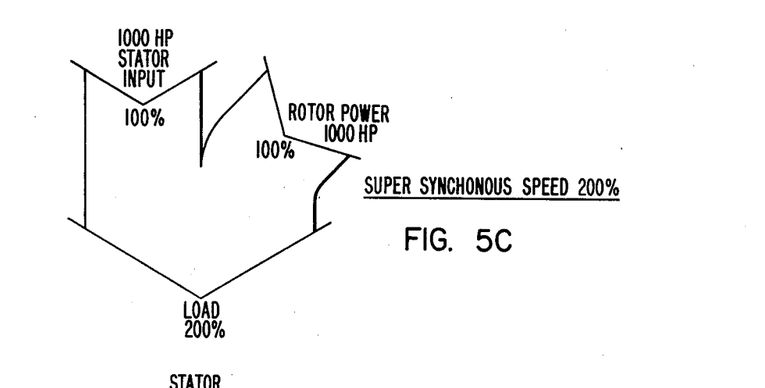

FIG. 5C shows the situation when RBS bridge generates power on the rotor at 100% while at synchronous speed, while the stator delivers 100% power, for a total of 200% power on the shaft, thus allowing the same efficiency with half the normal rating.

Figure 5D:
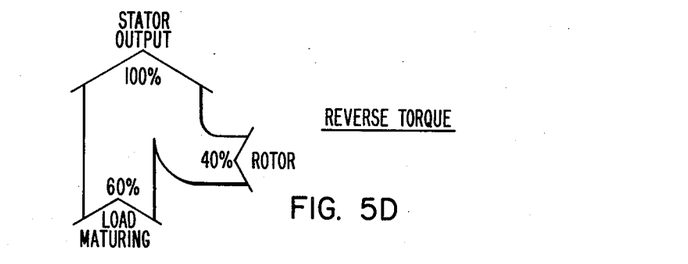

FIG. 5D represents reverse torque when the system is regenerating at 60% speed; with 40% power delivered by the rotor through the RBS bridge in the inverting mode, whereby the stator output collects 100% power.

The operation of the RBS bridge and the line bridge INV under control of the firing angle by gate pulse generators WFG ($\alpha_R$) and GCI ($\alpha_L$) will be described hereinafter in the context of FIGS. 6A-6G.

Starting at zero speed, the motor drive of FIG. 1 is accelerated up to 100% speed by gating bridge RBS at zero degree (rectifying mode) while bringing $TH_1$-$TH_6$ of line bridge INV from $\alpha_L=180°$ down to $\alpha_L=90°$ retardation. Actually 180° is not feasible and in practice the maximum retardation will be $\alpha_L=155°$.

Figure 6A:
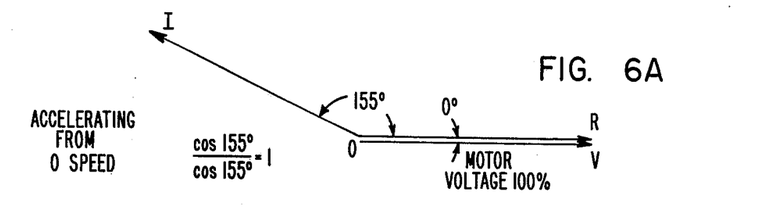
FIGS. 6A-6G show vectorially the relation between the voltage vector of the inverter bridge of FIG. 1 and the voltage vector of the rotor bridge of FIG. 1 for acceleration from zero speed (6A); acceleration from 50% speed (6B); motoring at 100% speed (6C); deceleration from 100% speed (6D); deceleration from 50% speed (6E); reverse torque at zero speed (6F); and motoring in reverse direction (6G)
Figure 6B:
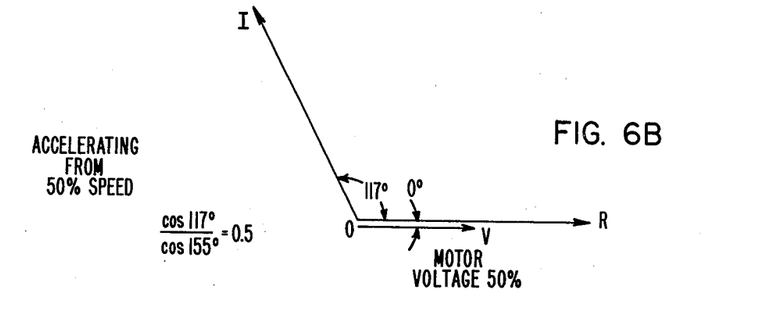
Figure 6C:
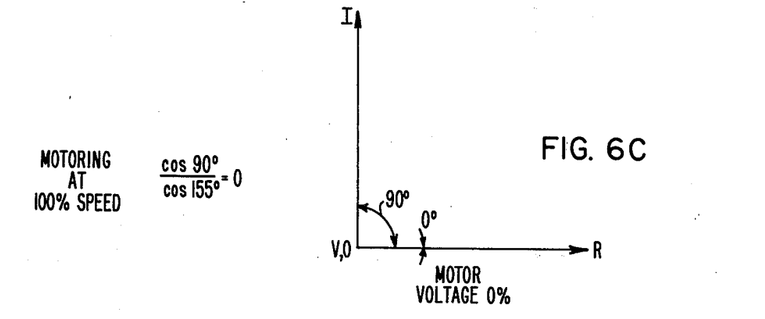

FIGS. 6A and 6C show vectorially the relation between the voltage vector OI of line bridge INV and the voltage vector OR of the rotor bridge RBS ($\alpha_R=0°$) for $\alpha_L$ values 155° (a practical angle rather than 180°), 117° and 90°, respectively. Vector OR, actually is a fictive vector in ampitude, shown only to indicate an angular position.

$\alpha_L=155°$ being the maximum retardation practical with the inverter bridge thyristors, the value of the motor voltage OV, which is 100% at zero speed and 155°, depends upon a proportional factor $K=\cos \alpha_L/\cos 155°$. As shown in FIG. 6B, OV becomes 50% at $\alpha_L=117°$ since $K=\cos 117/\cos 155=0.5$. For 90°, the speed is 100% while $K=\cos 90°/\cos 155°=0$. Therefore, the motor voltage is practically nil.

Figure 6D:
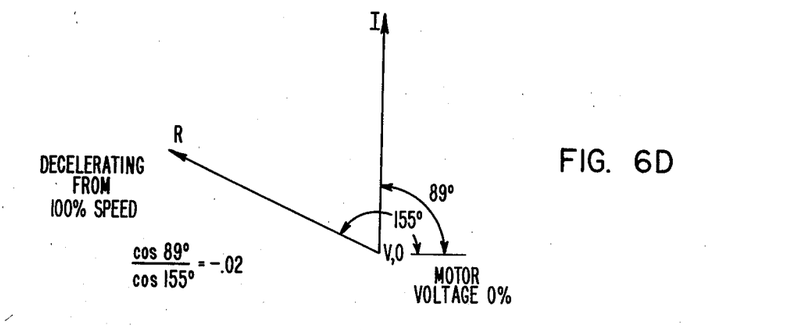

It is assumed now that as the motor is running at synchronous speed (100%), thyristors $T_1$-$T_6$ of rotor bridge RBS are controlled in accordance with the present invention to decelerate the motor. First $\alpha_L$ is set somewhat below 90°, namely at 89° as shown in FIG. 6D. Between 180° and 90° line bridge INV is in the inverting mode. By bringing $\alpha_L$ below 90° the line bridge INV becomes operative in the converting mode, enough to overcome the DC link voltage and force current into the DC link. At the same time rotor bridge RBS being controlled at $\alpha_R=155°$ converts the DC link voltage into rotor current, whereby the motor consumes power and establishes a braking torque. The value of OV is still very small (source $K=\cos 89°/\cos 155°=-(0.02)$ (FIG. 5D).

Figure 6E:
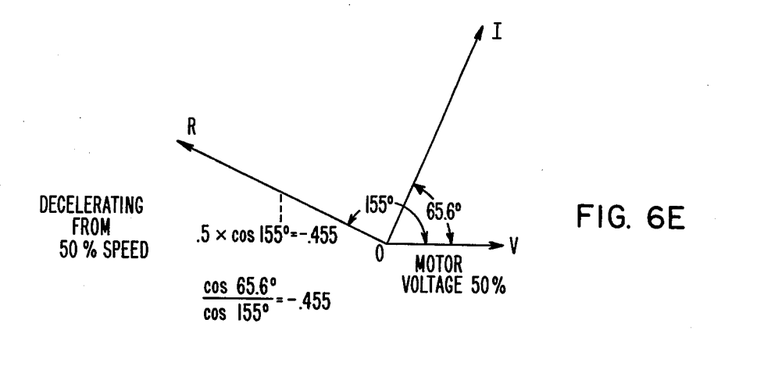
Figure 6F:
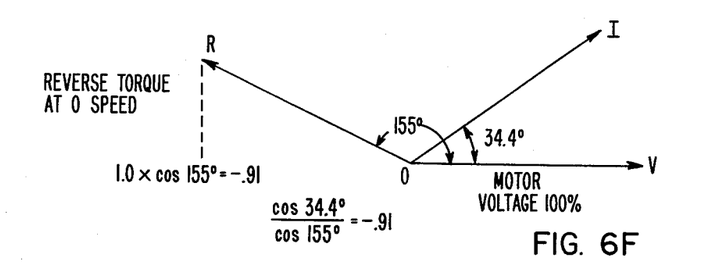
Figure 6G:
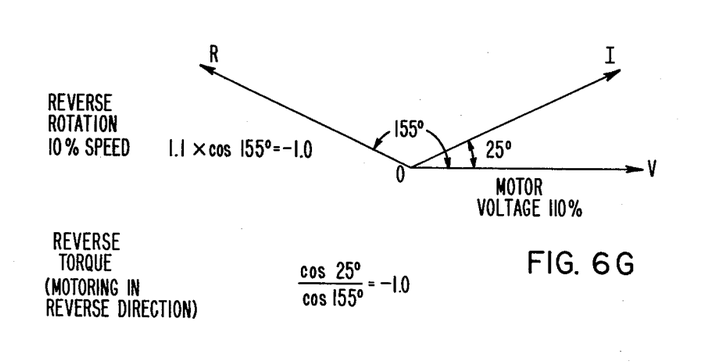

Referring to FIG. 6E, deceleration is shown down to nearly 50% speed, e.g., when $TH_1$-$TH_6$ of bridge INV are controlled with $\alpha_L=65.6$ retardation. Now $K=\cos 65.6°/\cos 155°=-(0.455)$. OV has been reduced by nearly one half. Zero speed is reached when $\alpha_L=30°$. FIG. 6F illustrates the situation when zero speed $\alpha_L$ is brought to 34.4°. Then $K=\cos 34.4/\cos 155=-(0.91)$. At that moment a reverse torque starts building up, and reverse rotation is reached (FIG. 6G) when $\alpha_L=25°$, since $\cos 25°/\cos 155°=-(1.0)$. The motor drive is motoring again.

Figure 7:
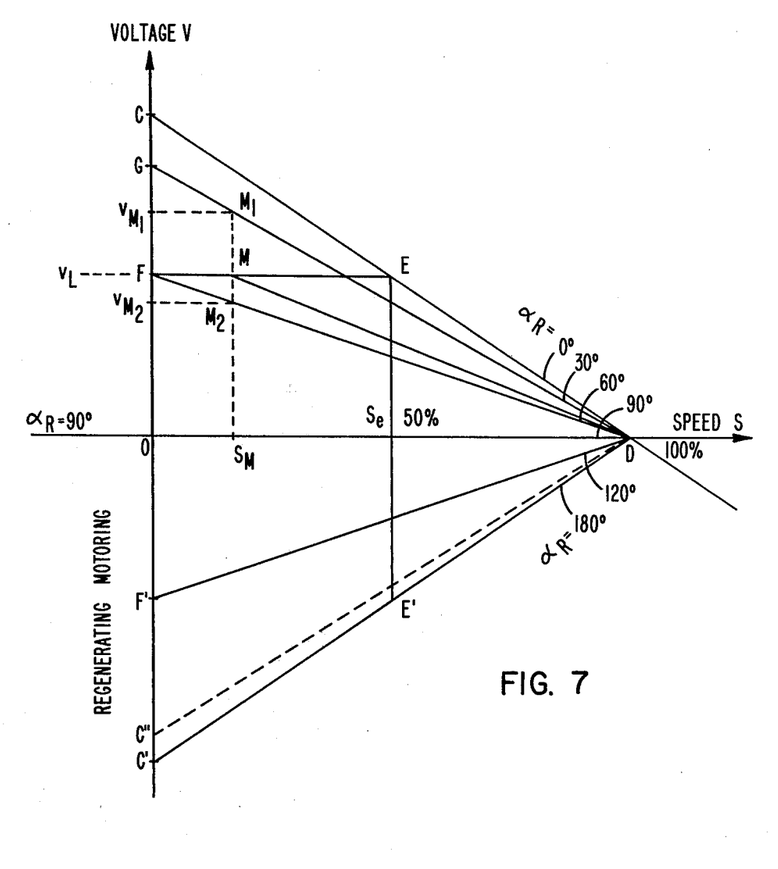
FIG. 7 shows the dynamic characteristics of rotor voltage versus speed for different angles of retardation of the thyristors of the rotor bridge of FIG. 1.

Referring now to FIG. 7, dynamic characteristics of the motor drive system according to the present invention are shown for various values of $\alpha_R$. For the sake of simplicity the characteristics are assumed to be linear, the rotor voltage V being plotted as a function of speed S. Thus, each slope corresponds to a particular retardation angle $\alpha_R$ gating by circuit WFG of FIG. 1 onto thyristors $T_1$-$T_6$ of rotor bridge RBS. At zero degree, the motoring torque is along line CD, where C is the ordinate at zero speed, namely 100% of motor voltage and D is the operating point for zero motor voltage and 100% speed. Typically, line DF represents motoring torque for $\alpha_R=60°$, e.g., where $OC/OF=\cos 0°/\cos 60°=1/0.5=2$. Then, F is the ordinate for 50% rotor voltage. Similarly, line DG for 30° retardation intersects the ordinate at G such that $OC/OG=\cos 0°/\cos 30°=1/0.86$, thus G corresponds to 86% rotor voltage.

As earlier stated by reference to FIGS. 5A-5C, the motor can be accelerated from zero speed to 100% speed by controlling $\alpha_L$, the retardation angle from circuit GCI of FIG. 1 onto thyristors $TH_1$-$TH_6$ of line bridge INV from 155° to 90°, while keeping in section RBS $\alpha_R=0°$ from circuit WFG. The motoring torque during acceleration is thus along line CD of FIG. 7.

In accordance with an important feature of the present invention, the motor drive system of FIG. 1 is so arranged that speed control from zero to maximum speed does not follow line CD which would require maximum motor voltage at zero speed, but rather along FED, namely following FE from zero speed to 50% speed as illustrated in FIG. 7, then, ED from 50% speed to 100% speed. In this fashion, the overall rating of the inverter is reduced by half. It follows that $E_{AB}$ in the DC link will also be substantially reduced, and the rating of transformer TNF will be reduced to the same extent. Line EF is preferred because it maximizes the gain represented by area EFC in cutting the rating requirement, while the area OFED represents a constant rating requirement. Indeed, operative point E may be chosen to be closer to D than to C, thereby reducing the normal slip recovery mode to a narrower speed range and reducing the rating further. To achieve a characteristic deviating from line CD, the thyristors $T_1$-$T_6$ are no longer fired always with no retardation as it would in accordance with FIGS. 6A and 6B if they were mere diodes. Instead, in order to force the operative point M to follow FE, rather than CE, while bringing the speed up to 50% (point E) gating pulse generator is so controlled as to increase the slope of DF progressively as a function of the operative speed $S_M$ until DF reaches DE. Therefore, $\alpha_R$, the retardation angle of thyristors $T_1$-$T_6$ is brought down from 60° (for DF) to 0° (for DE). The control circuit of FIG. 1 ensures automatic correction of any error $\epsilon$ appearing with the operative point M above ($\epsilon>0$ if at M1 above DM) or below ($\epsilon<0$ if at M2 below DM) the assigned level $V_L$ corresponding to an operative point on FE, e.g., at half the maximum rotor voltage (OC) in the example chosen. Accordingly, circuit detects the error $V_M$-$V_L$ and controls the reference $V_R$ applied to WFG in order to bring about a correction in $\alpha_R$ whereby the slope of DM matches the speed $S_M$ at all times. When $S_M$ reaches the abscissa $S_e$ for 50% speed, the value of $\alpha_R$ should have been reduced to zero and thyristors $T_1$-$T_6$ will now on behave like rectifiers. During the overall acceleration process as explained by reference to FIGS. 6A to 6C the retardation angle $\alpha_L$ applied by gating pulse generator GCI to thyristors $TH_1$-$TH_6$ of the line bridge INV will have been changed from an initial 180° (in fact 155°) to the value $\alpha_L=90°$.

If the load is a fan, or a pump, normal operation will be most of the time around synchronous speed or somewhat lower. For the sake of illustration, it is assumed that normal speed range extends from 50% to 100% speed, thus along line ED of FIG. 7.

If deceleration is to be effected down to zero speed, as earlier seen by reference to FIGS. 6D, 6E, the thyristors $T_1$-$T_6$ of rotor bridge RBS are controlled by circuit WFG so that $\alpha_R=155°$, while circuit GCI establishes for thyristors $TH_1$-$TH_6$ of inverter bridge INV, a retardation angle $\alpha_L$ which initiates at 89° (rather than 90° in order to overcome the voltage drop of the static devices in the DC link) and is reduced progressively to 60°. As shown in FIG. 7 this corresponds to a slope along DC" (155°) rather than the maximum slowing down characteristic of DC' (180°) which is not feasible in practice. Again, as in the acceleration mode, the present invention offers the advantage of being able to force the operative point G to follow an horizontal line from E' (50% speed) to F' (zero speed), thereby to reduce the maximum rotor voltage required when decelerating the motor.

While control of the retardation angle $\alpha_L$ of line bridge INV by gate pulse generator GCI in the context of the present invention does not bring any particular difficulty because INV is coupled through transformer TNF to the power supply lines which have a definite frequency and voltage at all times, control of the retardation angle $\alpha_R$ of thyristors $T_1$-$T_6$ is not effected in the conventional manner for the following reasons.

Figure 8:
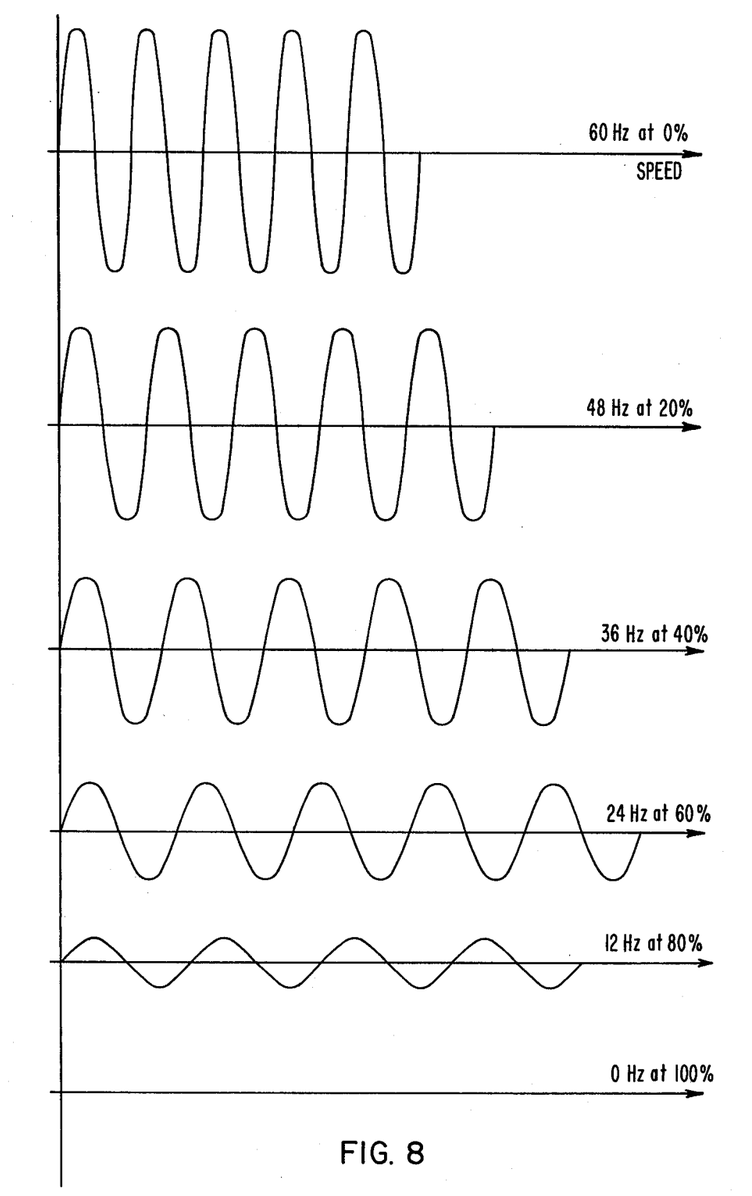
FIG. 8 is a set of curves representing the rotor voltage at the input of the rotor bridge of FIG. 1 for six different speeds, respectively.

FIG. 8 shows the rotor voltage at various speeds, namely (a) to (f) for 0%, 20%, 40%, 60%, 80% and 100% speed. At 0% speed the rotor output is maximum and the frequency is 60 cycles per second if the stator ST is supplied with 60 cycle power from L1, L2, L3. At 20% speed the frequency is reduced to 48 Hz and the voltage to 80% in magnitude. At 40% speed the frequency is 36 Hz and the magnitude lowered to 60%, and so on. It appears that at 80% speed the frequency of the rotor output is merely 12 Hz with 20% voltage magnitude, to become at 100% speed zero frequency and zero magnitude. It is clear that with such variable voltage and variable frequency input to the bridge across the rotor, control of the SCR devices under natural commutation is anomalous and does not compare to more conventional AC power supplies.

Figure 9A:
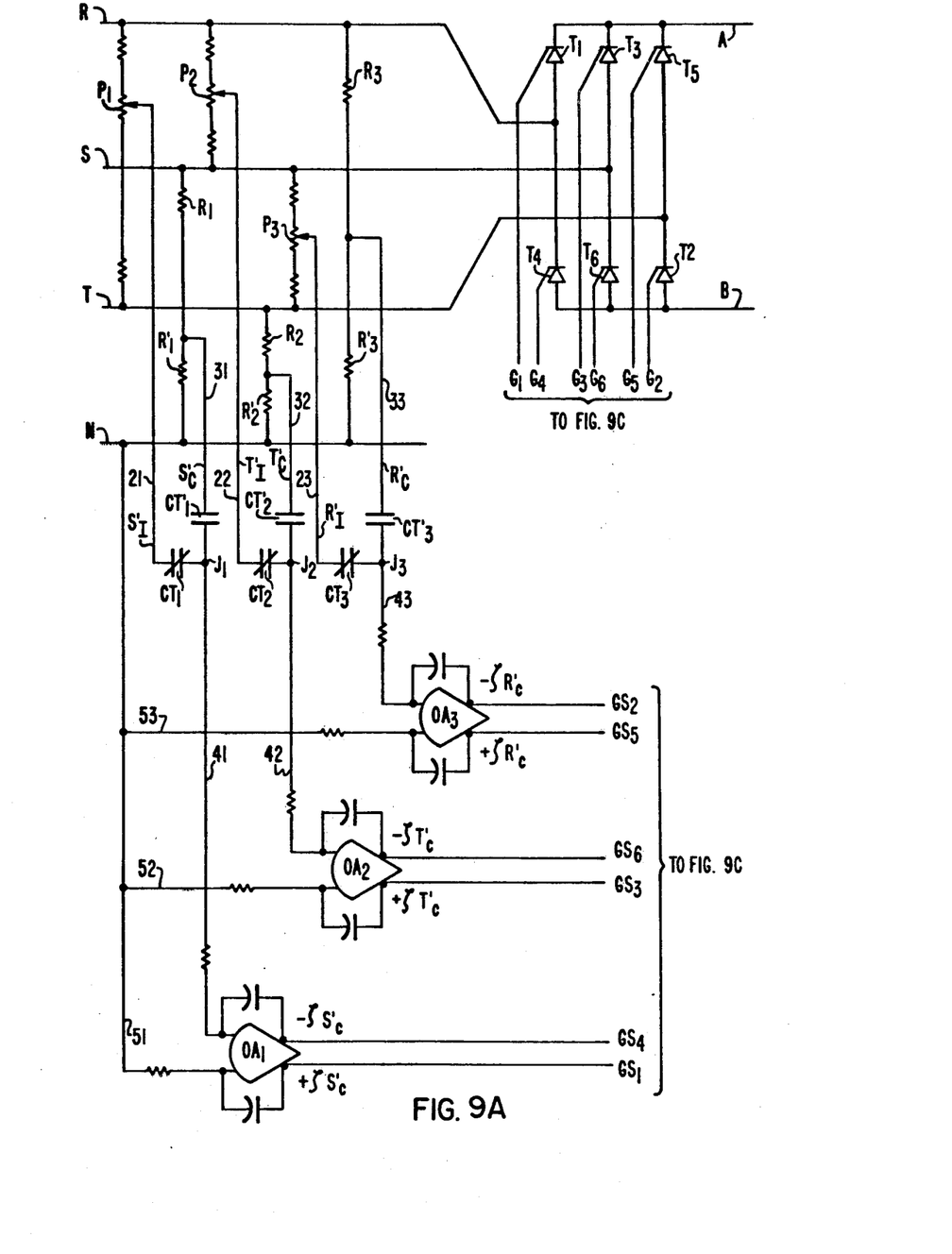
FIGS. 9A-9C show by three sections the overall organization of a wide frequency gating system typically used according to the invention to control the rotor bridge of FIG. 1.
Figure 9B:
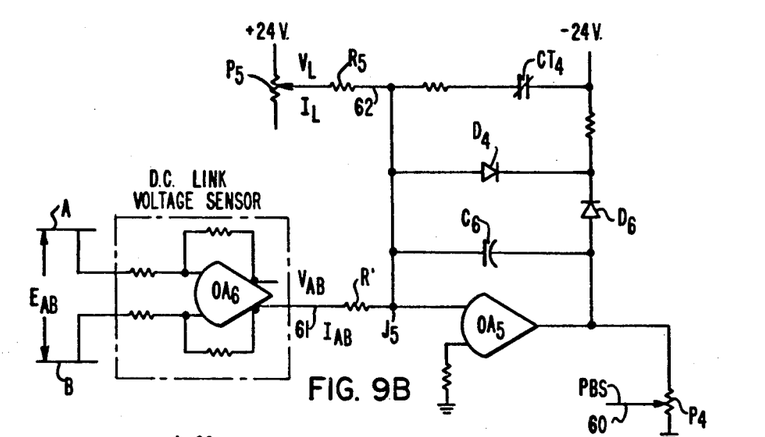
Figure 9C:
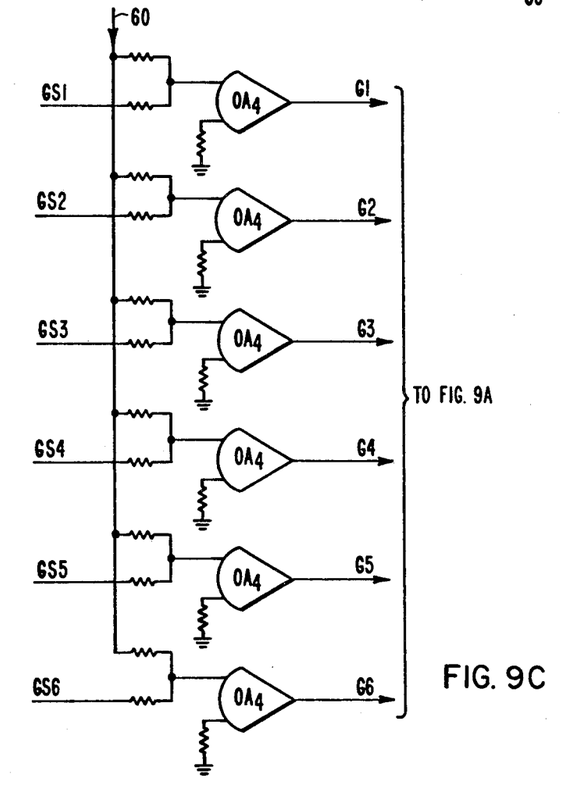

Referring to FIGS. 9A, 9B and 9C, the wide frequency pulse generator WFG of FIG. 1 is shown hooked on the three phases R, S, T of rotor RT. Circuit WFG includes three sections: an acceleration-deceleration control mode section (FIG. 9A); a phase-back control mode section (FIG. 9B) establishing a controlled rotor voltage level during a chosen speed range, like explained earlier by reference to FIG. 7; and a gate driver section (9C) which is responsive to either or both of the two former sections for applying timely gating pulses on six parallel lines $G_1$-$G_6$ to the respective control electrodes of SCR devices $T_1$-$T_6$ of the rotor bridge section RBS.

Referring to FIG. 9A, between phase lines R and T a series network of resistors includes a central potentiometer $P_1$ inserted between two equal resistors. Similarly between phase lines R and S there is a potentiometer $P_2$. A potentiometer $P_3$ is between phase lines S and T. Two equal resistors ($R_1$, $R'_1$) are in series forming a divider between phase line S and neutral potential line N. Similarly, ($R_2$, $R'_2$) are between phase line T and line N. ($R_3$, $R'_3$) form the divider between phase line R and neutral line N.

Three operational amplifiers $OA_1$, $OA_2$, and $OA_3$ are associated with the respective phases as follows: Line 21 from potentiometer $P_1$ goes through contacts $CT'_1$ to junction $J_1$ to which the middle point of ($R_1$, $R'_1$) reaches also, via contacts $CT_1$. Junction $J_1$ is connected by line 41 to one input of operational amplifier $OA_1$. Neutral line N goes by line 51 and a resistor to the second input of operational amplifier $OA_1$. The same arrangement prevails for operational amplifier $OA_2$ (contacts $CT'_2$, $CT_2$) to junction $J_2$ from $P_2$ and ($R_2$, $R'_2$), respectively, with $J_2$ going by line 42 to one input of $OA_2$, as for operational amplifier $OA_3$ (contacts $CT'_3$, $CT_3$) to junction $J_3$ from $P_3$ and ($R_3$, $R'_3$) respectively with $J_3$ going by line 43 to one input of $OA_3$. Neutral line N is connected by line 52 and a resistor to the second input of $OA_2$, whereas it is connected by line 53 and a resistor to the second input of $OA_3$. The operational amplifiers are mounted with differential inputs and provides two outputs of equal magnitude but opposite polarities. A relay CT (shown in FIG. 11) controls simultaneously contacts $CT_1$, $CT'_1$, $CT_2$, $CT'_2$, $CT_3$, $CT'_3$ in such a way that, when contacts $CT_1$, $CT_2$, $CT_3$ are opened, contacts $CT'_1$, $CT'_2$ and $CT'_3$ are closed, and conversely.

Operational amplifiers $OA_1$, $OA_2$, $OA_3$ generate on respective pairs of lines ($GS_4$, $GS_1$), ($GS_6$, $GS_3$) and ($GS_2$, $GS_5$) synchronization pulses which actuate corresponding channels in the gate driver section (FIG. 9C) to apply gating pulses $G_1$-$G_6$ to the respective thyristors $T_1$-$T_6$ as will be explained by reference to the vectorial diagram of FIG. 10.

Figure 10:
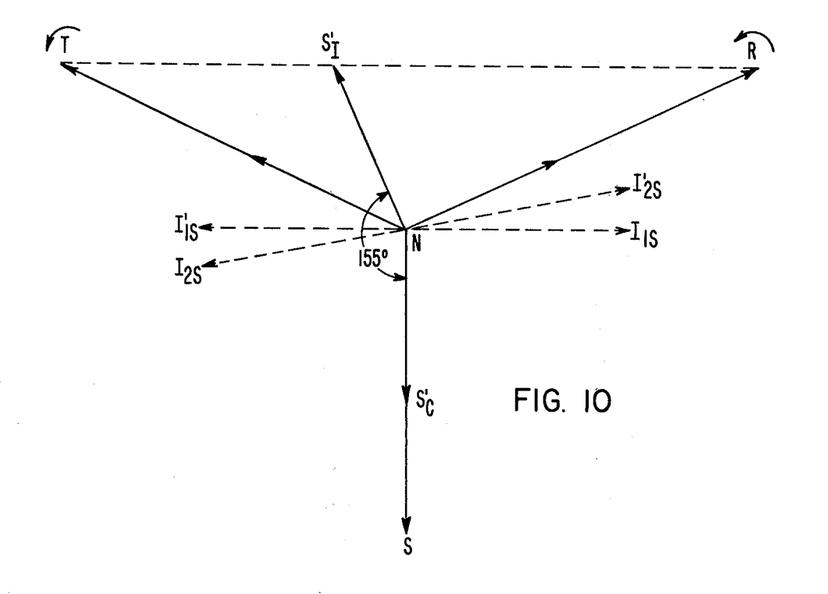
FIG. 10 is a vectorial representation of the input voltages and of the derived time reference voltage used to define the firing instant, in the case of the wide frequency gating system of FIGS. 9A-9C.
Figure 11:
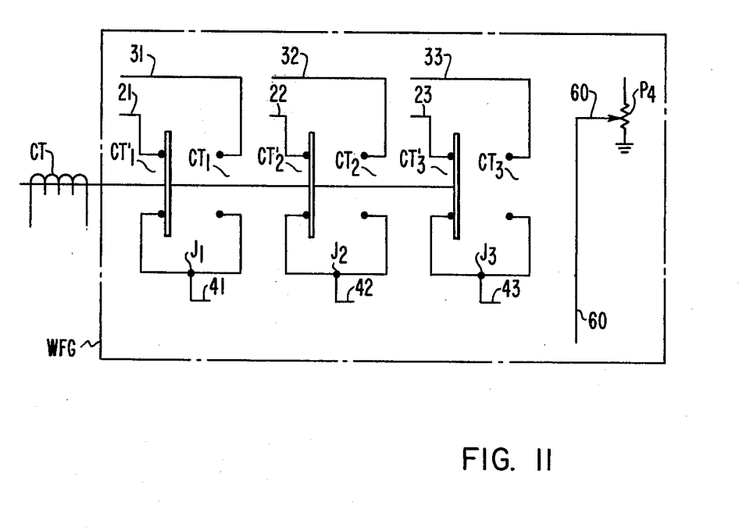
FIG. 11 shows the relay with its contacts as can be used in the context of FIG. 9A.

FIG. 10 shows the three phase voltage vectors R, S, T which are assumed to turn counter-clockwise, so that when, between phase R and phase T, R passes above vector T, as shown in FIG. 10, it is the right instant for natural commutation of thyristor $T_1$ of line R for gating at zero retardation ($\alpha_R=0$) like illustrated in the instances of FIGS. 6A, 6B, 6C e.g. when the motor is being accelerated from zero speed to maximum speed (at the same time thyristors $TH_1$-$TH_6$ at the line side are being fired with a retardation angle going from 155° (in practice) initially, to 90° at 100% speed). Timing for such zero retardation firing angle requires, though, a zero-crossing reference on the time wave reference. However, with phase lines of such widely variable frequency and voltage (see FIG. 8) the derivation of a time reference wave in the conventional manner (see B. R. Kelly "Thyristor Phase-Controlled Converters and Cycle Converters" 1971, Chapter Nine, pages 229-247) does not work. It is assumed first that zero angle retardation is established by having relay CT close contacts $CT'_1$, $CT'_2$ and $CT'_3$, and open contacts $CT_1$, $CT_2$ and $CT_3$ as shown in FIG. 11. Accordingly, it is now proposed, as shown in FIG. 9A first to derive a signal $S'_c$ representative of vector S (which is symmetrically disposed relative to vectors R and T) (FIG. 10). This appears at the differential inputs to operational amplifier $OA_1$. One input is derived along the path $R_1$, $R'_1$, 31 J1 and 41. Secondly, operational amplifier $OA_1$ converts such inputted differential signal into two opposite polarity signals representing the integral of vector $S'_c$, namely, vectors $(+I_{1S})$ and $(-I_{1S})$ at 90° and 180° as shown in FIG. 10. These two output signals are applied via output lines $GS_1$ and $GS_4$ of $OA_1$ to thyristors $T_1$ and $T_4$ respectively. From a consideration of FIG. 2A, it appears that while retardation of vector S characterizes a cosine curve symmetrically disposed between curves R and T, the integral of S is a curve shifted at 90° therefrom. Therefore, a zero-crossing point does exist exactly at time $t_1$ when, at operative point a the voltage of phase R comes to exceed the voltage of phase T. This situation thus, must coincide with $T_5$ being turned OFF and $T_1$ being turned ON (FIG. 2A). This result is accomplished by the transition signal on line $GS_1$ at the cross-over point $t_1$ of $\int S'_c$. Similarly, at operative point b (time $t_4$) the voltage of phase R comes to exceed the voltage of phase T in the negative direction (180° later from the position shown by vectors R, S, T in FIG. 2A). Therefore, a transition signal on line $GS_4$ will cause thyristor $T_4$ to be turned ON while thyristor $T_2$ will be turning OFF. The same can be said of instants $t_3$ and $t_6$ with regard to vector $T'_c$ (not shown) and $+\int T'_c$ and $-\int T'_c$ as derived from operational amplifier $OA_2$. The same observation can also be made for operational amplifier $OA_3$ regarding vector $R'_c$ (not shown) and instants $t_2$ and $t_5$. The Table, herebelow, summarizes for zero degree retardation the time relation of the transition signals at instant $t_1$-$t_6$ of output lines $GS_1$-$GS_6$ with regard to thyristors $T_1$-$T_6$, phase lines R, S, T and operational amplifiers $OA_1$-$OA_3$.

TABLE

Zero Degree Control By WFG
(Contacts CT'$_1$, CT'$_2$, CT'$_3$ closed)

|  | t$_1$ | t$_2$ | t$_3$ | t$_4$ | t$_5$ | t$_6$ |
|---|---|---|---|---|---|---|
| >o Polarity Thyristor ON | T$_5$ | T$_1$ | T$_1$ | T$_3$ | T$_3$ | T$_5$ T$_5$ |
| Phase of conduction | T | R | R | S | S | T T |
| <o Polarity Thyristor ON | T$_6$ | T$_6$ | T$_2$ | T$_2$ | T$_4$ | T$_4$ T$_6$ |
| Phase of conduction | S | S | T | T | R | R S |
| Transition $\int R'_c$ (OA$_3$, GS$_5$) |  |  |  |  | x |  |
| Transition $-\int R'_c$ (OA$_3$, GS$_2$) |  | x |  |  |  |  |
| Transition $\int S'_c$ (OA$_1$, GS$_1$) | x |  |  |  |  |  |
| Transition $-\int S'_c$ (OA$_1$, GS$_4$) |  |  |  | x |  |  |
| Transition $\int T'_c$ (OA$_2$, GS$_3$) |  |  | x |  |  |  |
| Transition $-\int T'_c$ (OA$_2$, GS$_6$) |  |  |  |  |  | x |

It is now assumed that relay CT (FIG. 11) has been manually set, or otherwise actuated, into its second position. Contacts CT'$_1$, CT'$_2$ and CT'$_3$ are now open, while contacts CT$_1$, CT$_2$ and CT$_3$ are closed. In such case, as shown by FIG. 9A, each input line (41, 42 or 43) derives as input for the associatd operational amplifier (OA$_1$, OA$_2$ or OA$_3$) a signal representative of the position of the moving arm on the potentiometer (P$_1$, P$_2$ or P$_3$). Referring to FIG. 10, if each moving arm is offset by, say 25°, from its middle position, e.g. half way between the adjacent phase lines, a vector such as S'$_I$ is derived from the potentiometer (P$_1$) (similarly R'$_I$ for P$_3$ and T'$_I$ for P$_2$ which are not shown in FIG. 10 for the sake of clarity) which in the chosen example is at 155° retardation from vector S (zero degree). Therefore, OA$_1$, OA$_2$ and OA$_3$ are now responsive each to 155° retardation, and the integrated outputs ($\pm \int R'_I$, $\pm \int S'_I$ and $\pm \int T'_I$) define crossover points at $\pm 90°$ to the associated vector (S'$_I$, T'$_I$ or R'$_I$).

It is easily understood how the aforegoing Table should be transposed when relay CT is in its second state in order to define firing instants such as t$_1$-t$_6$ which correspond to 155° retardation for thyristors T$_1$-T$_6$ in accordance with signals outputted on lines GS$_1$-GS$_6$ of FIG. 9A. Thus, control mode of circuit WFG (FIG. 1) is now in accordance with FIGS. 6D, 6E, 6F and 6G, depending upon the retardation angle $\alpha_L$ imposed by circuit INV of FIG. 1 ($\alpha_L=89°$ to start deceleration from 100% speed; $\alpha_L=65.6°$ when decelerating from 50% speed; $\alpha_L=34.4°$ when exerting a reverse torque at zero speed; $\alpha_L=25°$ when motoring is effected in the reverse direction).

Referring to FIG. 9C, the gate driver circuit is shown to include six operational amplifiers OA$_4$, one in each of six channels which are controlled by a corresponding one of the six output lines GS$_1$-GS$_6$ from operation amplifiers OA$_1$-OA$_3$ of FIG. 9A. In response to the synchronizing pulses of GS$_1$-GS$_6$, operational amplifiers G$_1$-G$_6$ provide gating pulses, one for each control electrode of thyristors T$_1$-T$_6$, respectively.

It is observed that operational amplifiers OA$_1$-OA$_3$ provide a sufficient and well defined transition signal at times t$_1$-t$_6$, independently from the amplitude of vectors (R'$_C$, R'$_I$), (S'$_C$, S$_I$) or (T'$_C$, T'$_I$) and the frequency of rotation. This can best be understood from a consideration of FIG. 8. When the speed goes up, the rotor voltage (R$_C$, S$_C$, T$_C$) goes down, and also the frequency goes down. When the frequency decreases, the signals out of one of the operational amplifiers OA$_1$, OA$_2$, OA$_3$ would normally tend to increase. However, the inputted signals also tend to decrease with speed. Therefore, the two effects are compensated by the effect of the integration, and the outputted signal ($\pm \int R_c$, $\pm \int S_c$, $\pm \int T_c$) remains substantially constant. Therefore, the problem caused during acceleration, or deceleration, by the wide change in voltage and frequency illustrated by curves of FIG. 8, no longer exists. As a matter of fact, control by circuit WFG has become possible in a wide frequency range extending from a 60-period down to a few cycles.

Referring to FIGS. 9B, 9C control of the amplifiers OA$_4$ of section 9C is shown to further include a phase back signal PBS outputted, through contacts CT$_4$ line 60 and potentiometer P$_4$ by operational amplifier OA$_5$. Signal PBS is added to the gating signal from lines G$_1$-G$_6$ so that each gating signal of lines G$_1$-G$_6$ is synchronized with a bias defined by the phase-back signal amplitude. As a result, retardation of thyristors T$_1$-T$_6$ can be modified. In the illustrative embodiment of the invention, signal PBS obtained on line 60 results from a ramp generator comprising operational amplifier OA$_5$ mounted as a comparator so that a variable current I$_{AB}$ representative of the voltage V$_{AB}$ derived from the voltage sensor VS of FIG. 1 is applied at input junction J$_5$ via line 61, concurrently with a current I$_L$ representative of the bias V$_L$ derived from a potentiometer P$_5$ via line 62. Contacts CT$_4$ shown in FIGS. 1 and 9B are part of a shunting loop between output and input. When contacts CT$_4$ are closed they shunt the ramping circuit comprising capacitor C$_6$ and resistor R' associated with in the feedback loop of operational amplifier OA$_5$. A diode D$_6$ is inserted between diode D$_4$ and the output of OA$_5$ in order to prevent the output from going negative when $-V_{AB}$ is less than the bias from P$_5$. In such case, when the DC link voltage is less than the bias from P$_5$, the phase back signal PBS is clamped to zero by diode D$_4$. When, however, $-V_{AB}$ exceeds the bias point, the phase back signal PBS is able to ramp positive until V$_{AB}$ becomes equal to the bias level. It appears that the operation of the circuit of FIG. 9B enables the motor drive system to accelerate while automatically changing the motoring characteristic from 60° to zero degree as explained earlier by reference to FIG. 7, e.g., when speed, as detected on line 61 (FIG. 9B) goes from zero to 50% the limit level V$_L$ (FIG. 7) being determined by the bias from line 62 (FIG. 9B). Accordingly, the operative point M, while speed is changing will substantially follow line FE (FIG. 7).

We claim:

1. In a wound-rotor slip recovery motor drive having a rotor outputting rotor voltage on rotor output lines and a stator supplied with AC voltage from AC power lines, an SCR rotor bridge naturally commutated by said rotor lines, an SCR line bridge naturally commutated by said AC power lines, a DC link between said rotor and line bridges; first means for gating said rotor bridge with a retardation angle $\alpha_R$; second means for gating said line bridge with a retardation angle $\alpha_L$; the combination of:

third means operative in the accelerating mode for applying to said first gating means a first control signal representing zero retardation $\alpha_R$ and operative in the decelerating mode for applying to said first gating means a second control signal representing a first maximum retardation angle $\alpha_R$;

means for switching said third means into one of said accelerating and declerating modes when said motor drive is initially at one of zero and maximum speeds;

fourth means for varying $\alpha_L$ in a range corresponding to zero speed and maximum speed;

fifth means operative on said first gating means concurrently with said first control signal in the accelerating mode for establishing a second maximum angle of retardation $\alpha_R$ initially when said motor drive is at zero speed initially and for reducing $\alpha_R$ from said second maximum angle down to zero until a predetermined speed intermediate between zero and maximum speed has been reached.

2. The motor drive of claim 1 with said AC power lines and rotor output lines being three-phase lines;

with said third means in the accelerating mode being responsive to the line-to-neutral voltages of said rotor output lines for deriving in relation to a thyristor "next" to be fired a signal representative of the line-to-neutral voltage relative to the third line voltage, means being provided for integrating said representative signal to derive said first control signal in relation to said "next" thyristor.

3. The motor drive of claim 1 with said AC power lines and rotor output lines being three-phase lines;

with said third means in the decelerating mode being responsive to the line-to-line voltages of said rotor output lines for deriving in relation to a thyristor "next" to be fired a signal representative of a voltage at substantially 155° relative to the phase line associated with said thyristor "next" to be fired;

means being provided for integrating said representative signal to derive said second control signal in relation to said "next" thyristor.

4. The motor drive of claim 1 with speed regulating means for controlling $\alpha_L$ in relation to DC link current and motor speed to maintain an operative speed.

* * * * *